April 24, 1962 J. W. McDUFFIE ETAL 3,030,877
HAY BALERS
Filed July 18, 1957 2 Sheets-Sheet 1
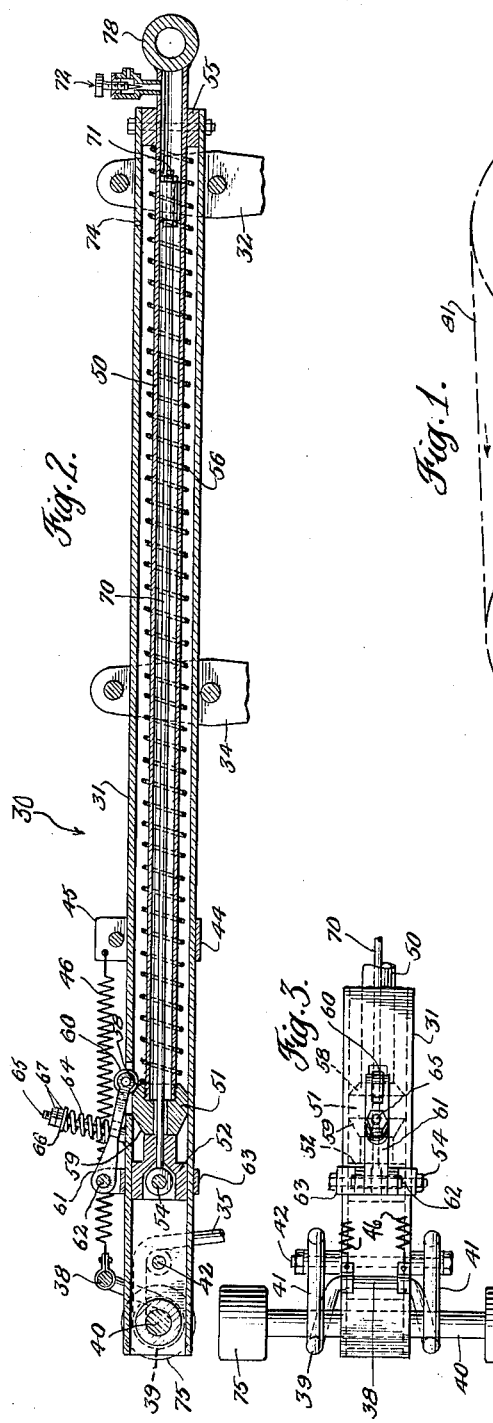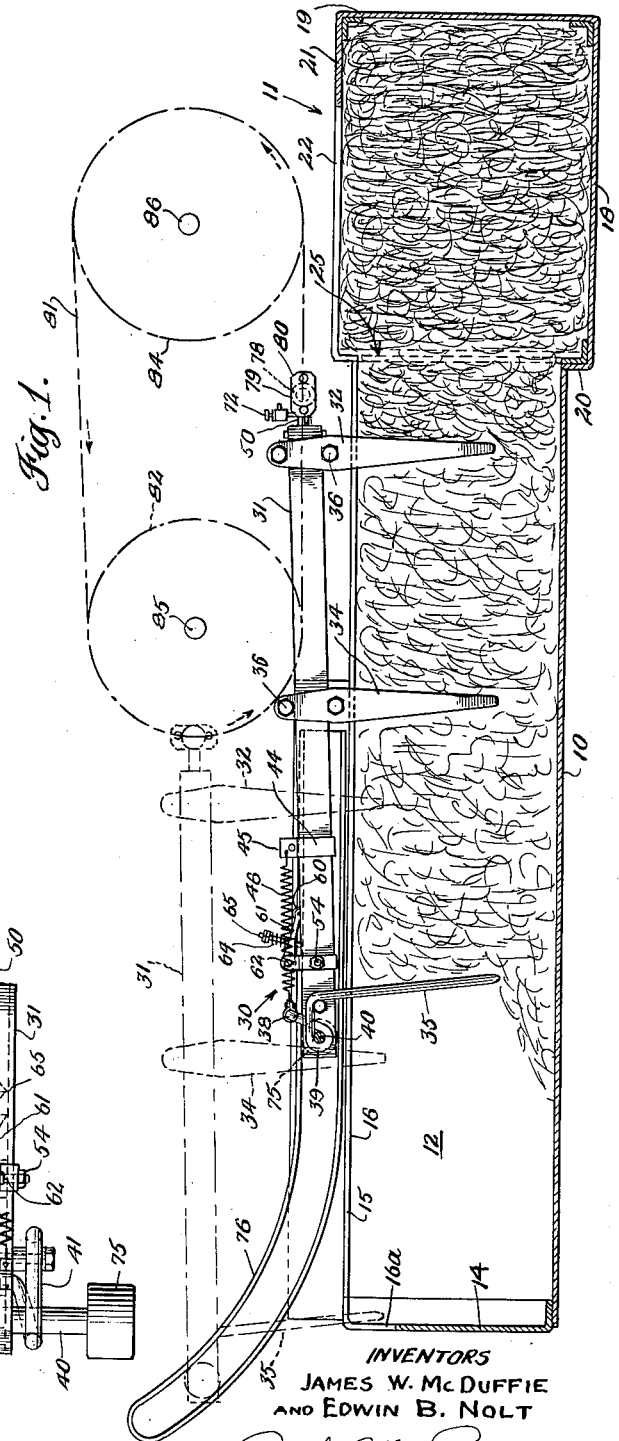
INVENTORS
JAMES W. McDUFFIE
AND EDWIN B. NOLT
Joseph Allen Brown
ATTORNEY April 24, 1962 J. W. McDUFFIE ETAL 3,030,877
HAY BALERS
Filed July 18, 1957 2 Sheets-Sheet 2

INVENTORS
JAMES W. McDUFFIE
AND EDWIN B. NOLT

Joseph Allen Brown
ATTORNEY

United States Patent Office 3,030,877
Patented Apr. 24, 1962

3,030,877
HAY BALERS
James W. McDuffie and Edwin B. Nolt, New Holland, Pa., assignors to Sperry Rand Corporation, New Holland, Pa., a corporation of Delaware
Filed July 18, 1957, Ser. No. 672,660
5 Claims. (Cl. 100—142)

This invention relates to automatic hay balers of the type in which hay is delivered to a bale chamber through an opening in a side thereof by means entering the bale chamber in timed relation to a plunger reciprocable in the chamber and past the opening therein. More particularly, the invention relates to an improved infeed mechanism of the finger or tine type for such a baler.

The primary object of this invention is to provide a feeding mechanism operative responsive to feeding conditions whereby if an overload of material occurs or an immovable object is encountered on a feeding stroke, the feeding action will stop completely and there will be no build-up in forces tending to move such material or object into the bale chamber with resulting strain on the drive for the feeding mechanism.

Another object of this invention is to provide a feeding mechanism, a driving mechanism and means connecting the driving and feeding mechanisms which is disconnectable responsive to feeding conditions.

Another object of this invention is to provide mechanism of the character described wherein after the drive and feed have been disconnected on a given working stroke of the feed mechanism, the feed and drive will thereafter be automatically reconnected before the next working stroke.

Another object of this invention is to provide a feeding mechanism and a drive therefor, both of which are positively protected against damage resulting from an unusual feeding condition.

A further object of this invention is to provide mechanism of the character described which is of relatively simple construction thereby enabling it to be manufactured at relatively low cost.

Other objects of this invention will be apparent hereinafter from the specification and from the recital in the appended claims.

In the drawings:

FIG. 1 is a part side elevation, part section showing a bale chamber and a feed platform having mounted above it a feeding mechanism constructed according to one embodiment of this invention, the drive for such feeding mechanism and a second position thereof being shown in broken lines;

FIG. 2 is an enlarged longitudinal vertical section through the feeding mechanism, the feed members thereon being illustrated fragmentarily;

FIG. 3 is a plan view of the left hand end of FIG. 2;

Figure 4:
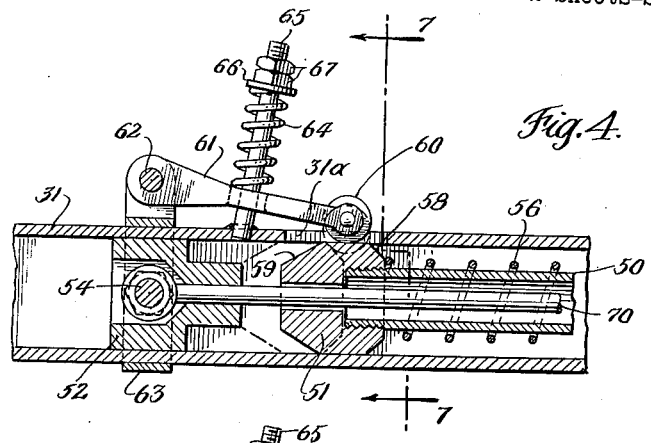
Figure 5:
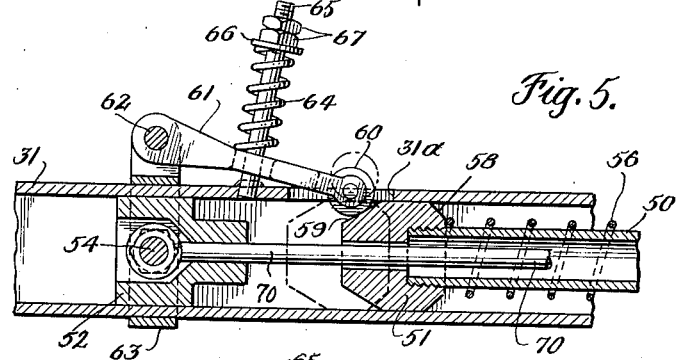
Figure 6:
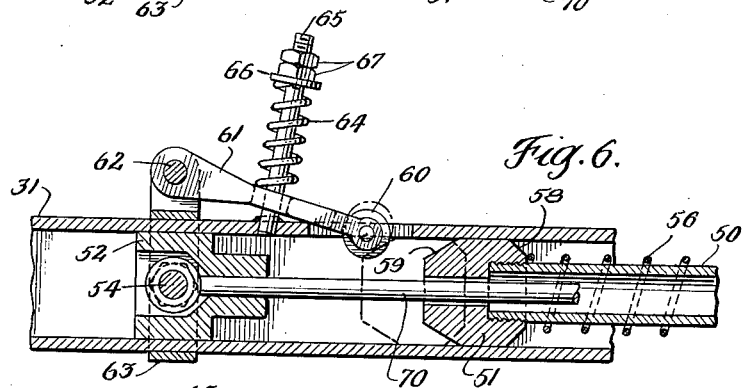
Figure 7:
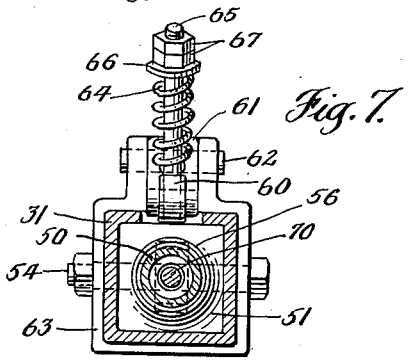

FIGS. 4, 5, and 6 are enlarged fragmentary views of the left end of the feeding mechanism viewed as shown in FIG. 2 and illustrating, sequentially, the operation of the latch means for separating the drive means from the feeding means; and, FIG. 7 is a section taken on the lines 7—7 of FIG. 4 and looking in the direction of the arrows.

Applicants' invention is particularly, although not necessarily, adapted for use in a hay baler of the type having a fore-and-aft bale chamber and a laterally disposed mechanism for picking up windrowed hay and delivering it through an opening in a side wall of the bale chamber. Such a baler is shown, for example, in U.S. Patent No. 2,757,602, issued August 7, 1956.

Referring now to the drawings by numerals of reference, 10 denotes a feed platform or table which extends laterally from a bale chamber 11. Platform 10 extends generally horizontally; and there is provided a rear wall 12, a side wall 14, remote from the bale chamber, and a top wall 15. Top wall 15 has slots 16 which extend from the bale chamber to wall 14; and side wall 14 has slots 16a communicating with the slots 16. Feed platform 10 is unobstructed forwardly whereby hay picked up from a conventional pick-up mechanism, as the baler is towed across a field, is delivered rearwardly and deposited in the area defined by platform 10, side wall 14, rear wall 12, and top wall 15.

Bale chamber 11 is generally rectangular in cross-section. It has a horizontal bottom wall 18 displaced somewhat below the level of platform 10, side walls 19 and 20, and a top wall 21. Top wall 21 has slots 22 which register with the slots 16; and side wall 20 has an opening 25 through which hay may be delivered from platform 10.

Reciprocable in bale chamber 11 is a conventional bale forming plunger, not shown, which compresses the hay delivered to the chamber into bales. The plunger moves aft on a working stroke and past the opening 25 and forward on a return stroke.

Mounted above top walls 15 and 21 is a feed mechanism 30 comprising an elongate tubular bar 31. Bar 31 extends in substantially the same direction as the direction of extent of feed platform 10. Spacedly mounted on bar 31 are three sets of feed fingers, namely, forward fingers 32, middle fingers 34, and rear fingers 35. The forward and middle fingers are rigidly but adjustably affixed to bar 31 as by bolt-nut means 36. The rear set of fingers 35 are pivotal in a counterclockwise direction relative to the bar, when viewed as shown in FIG. 1.

The rear fingers 35 are made from a single piece of rod having a horizontal portion 38 (FIGS. 2 and 3) which extends across the top of bar 31 and transverse to the axis of the bar, loops 39 on opposite sides of the bar which extend around a shaft 40 projecting through bar 31, horizontal portions 41 which extend along the sides of the bar and then project downwardly around outwardly projecting ends of a pin 42 also extending through bar 31 and suitably bolted thereto. A strap or bracket 44 surrounds bar 31 and is connected thereto at a point intermediate fingers 34 and 35. This strap has a pair of upstanding ears 45 to which the ends of a pair of tension springs 46 are connected. The opposite ends of springs 46 are connected to the horizontal portion 38 of fingers 35. It will be apparent that springs 46 bias fingers 35 in a clockwise direction, the clockwise movement of fingers 35 being limited by pin 42. However, the fingers may pivot in a counter-clockwise direction against the resistance of springs 46.

Extending into bar 31 is a tubular rod 50 having a piston member 51 threaded on its inner end. Member 51 is of such a size to permit it to slide within bar 31. Member 51 abuts against a fixed stop 52 connected to bar 31 by nut-bolt means 54. The end of rod 50 opposite piston 51 extends through a bearing block 55 within bar 31 and bolted thereto. Interposed between block 55 and piston 51 is a light spring 56, operable as hereinafter described.

As shown best in FIGS. 4–6, the top of piston 51 has inclined cam surfaces 58 and 59, respectively. Surface 58 is at a considerably sharper angle relative to horizontal than surface 59. Normally engaging surface 58 is a latch comprising a roller 60 carried on an arm 61 pivotally mounted at 62 on bar 31. Arm 61 is pivotally supported on a bracket 63 held in place by the same nut-bolt means which holds the stop 52 in place, namely, nut-bolt means 54. Arm 61 is biased downwardly by a spring 64 mounted on a pin 65 projecting through arm 61 and welded to bar 31. Engaging the upper end of spring 64 is a washer 66 held against displacement from pin 65 by lock-nuts 67 threaded on the pin. It will be apparent that by adjusting the lock-nuts 67 the force of spring 64 may be varied to thereby vary the holding force of roller 60 against the cam face 58 of piston 51.

Connected to nut-bolt means 54 and extending through stop 52 and piston 51 and into tubular rod 50 is a rod 70 having a piston 71 at its free end, FIG. 2. The diameter of piston 71 is such in relation to the diameter of the bore of tubular rod 50 that the passage of air around piston 71 is resisted. As shown in FIG. 2, rod 70 extends into rod 50 for substantially its full length. Piston 51 has a bore through which rod 70 projects, the diameter of the bore being considerably larger than the diameter of rod 70 whereby air may freely pass through the annular space thus formed.

Mounted on the outer end of tubular rod 50 is a conventional adjustable needle valve 72 communicating with the bore of rod 50 and operative to regulate the passage of air in and out of the rod. Bar 31 has an opening 74 through which air may freely escape, or be admitted as the case may be.

The end of the feed mechanism remote from the bale chamber is supported by rollers 75 carried on the ends of shaft 40 and slidable on arcuate guide track 76 mounted on the top wall 15 above the feed platform. The end of rod 50 outside bar 31 has a transverse sleeve 78 welded to it. This sleeve receives a rotatable pin 79 connected by link means 80 to an endless chain 81. Chain 81 is trained around a pair of spaced sprockets 82 and 84 rotatable on shafts 85 and 86, respectively. The specific means for mounting and driving the sprockets 82 and 84 in timed relation to the reciprocations of the plunger in bale chamber 10 may be similar to that shown in application Serial No. 574,698, filed March 29, 1956 and assigned to the assignee of this invention.

The disposition of the tracks and the mounting of the feed means is such that the feed fingers 32, 34, and 35 may project downwardly through the slots 16 in roof 15 whereby they may engage hay deposited on the feed platform 10.

Operation

Endless chain 81 is rotated around sprockets 82—84 in the direction indicated by the arrows from a source of power, not shown. The feeding means 30 being connected to chain 81 through pin 79 and bracket 80 is caused to reciprocate back and forth over platform 10 and the bale case 11. At the beginning of the working stroke, the feeding mechanism is in the position shown in dotted lines in FIG. 1. As chain 81 rotates, bar 31 is inclined downwardly and moved toward bale case 11, the rollers 75 rolling over the guide track 76. The configuration of the guide track is such that bar 31 is disposed angularly downwardly during the initial part of a working stroke then substantially horizontally, as shown in solid lines in FIG. 1, then upwardly as pin 79 passes around sprocket 84. The forward set of fingers 32 moves through opening 25 and into the bale chamber 11, being extracted therefrom through the slots 22 in the top wall 21 of the bale chamber. Depending on the position of adjustment of the middle set of fingers 34 they may or may not enter the bale chamber. During a return stroke the forward and middle set of fingers are above the top wall 15. The rear set of fingers 35 are below the top wall during the initial and middle part of the return stroke, being pivoted counter-clockwise against the resistance of spring 46 by the material on platform 10. However, when the rollers 75 engage the arcuate portion of track 76, the fingers 35 are lifted above and rearwardly of wall 15 whereupon they resume their erect position.

Under ordinary operating conditions, the downward force of spring 64 on arm 61 is sufficient to hold piston 51 stationary and prevent its axial movement within bar 31 and the movement of rod 50 outwardly of the bar 31. However, when an overload of material occurs on platform 10 or a foreign object enters the feed area tending to jam it up, the movement of such material or object by the feed fingers will be resisted. If this resistance is great enough to overcome spring 64, piston 51 will "break loose" as shown in FIGS. 2, 4–6. The roller 60 will slide up cam face 58 over the top of the piston and down the cam surface 59. Rod 50 will move relative to bar 31 and be extended outwardly and the feeding action will cease completely.

The relative movement of piston 51 in bar 31 will force air out of escape hole 74. At the same time, rod 50 will be moving relative to rod 70. The piston 71, preventing air from passing around it, will cause air to be evacuated through the space between rod 70 and piston 51. Such air is able to escape through the opening 31a (FIG. 4) in the top of bar 31. It will also be noted, that as piston 51 moves towards the stationary bearing block 55, spring 56 will be compressed. Spring 56 is a light spring and offers little resistance to the movement of the piston 51.

When pin 79 moves around sprocket 84, feeding mechanism 30 will be extracted upwardly, and as pin 79 moves on the upper reach of chain 81 toward sprocket 82, there will be a tendency for rod 50 to move towards its starting position. Once the feeding mechanism has been lifted clear of the hay on platform 10, spring 56 will become effective to push rod 50 and piston 51 back towards its latched position. The cam surface 59 on piston 51 will engage roller 60; and, due to the moderate incline of surface 59, arm 61 will be readily sprung upwardly against the resistance of spring 64 whereupon the roller 60 will roll over the top of piston 51 and drop behind the relatively sharply inclined surface 58 to re-latch the piston in place.

The return of piston 51 and rod 50 to starting position by spring 56 will be arrested by stop 52. To prevent undesirable shocks in the mechanism, the piston 71 and needle valve 72 are provided. The piston 71 forces air toward the needle valve 72 as rod 50 is returning. However, such air may escape through the needle valve 72 at only a prescribed rate and, therefore, piston 51 returns with a relatively mild action instead of a sharp impact once the feed fingers are clear of the hay.

With applicants' structure, the feeding action operates uninterrupted until an overload or foreign object stops the feed. The drive means is practically entirely relieved of the force it ordinarily exerts on a working stroke. Further, when an overload occurs, there is no build-up of forces against the driving means. Thus, wear is reduced and the mechanism will have a prolonged life.

While this invention has been described in connection with a particular embodiment thereof, it will be understood that it is capable of further modification and this application is intended to cover any variations, uses, or adaptations of the invention, following, in general, the principles of the invention and including such departures from the present disclosure as come within known or customary practice in the art to which the invention pertains, and as fall within the scope of the invention or the limits of the appended claims.

Having thus described our invention what we claim is:

1. A hay baler comprising a bale chamber having a feed opening in a vertical side wall thereof, a plunger reciprocable in said chamber and past said opening, a hay receiving platform extending from said feed opening, means operable in a vertical plane transverse to the reciprocation of said plunger and over substantially the full length of said platform for feeding hay into said chamber, said feeding means comprising a support disposed above said platform and mounted for reciprocal movement toward and away from said bale chamber in said vertical plane, a first hay feeding finger mounted on said support, a second hay feeding finger mounted on said support and spaced from said first finger in a direction away from said bale chamber, a movable endless drive chain disposed above said chamber and said platform, means connecting said support to said drive chain whereby said support normally moves with said chain, said connecting means including a latch, means for releasing said latch if either of said fingers encounters a resistance on a feeding stroke exceeding a predetermined amount, the feeding force on both of said fingers being stopped and said support being free to move relative to said chain upon release of said latch, and means for relatching said latch on the next return stroke of the feeding means, the means for releasing said latch and the means for relatching the latch being so constructed that the force required to relatch the latch is substantially less than the force required to unlatch the latch.

2. A hay baler comprising a bale chamber having a feed opening in a vertical side wall thereof, a hay receiving platform extending from said opening, and reciprocable means for feeding across said platform, through said opening and into said chamber, said feeding means comprising a tubular support bar mounted above said platform and extending in generally the same direction of extent as the platform, a plurality of feed fingers mounted on said bar in spaced relation thereon, a tubular rod extending into said bar through the end of the bar proximate to said bale chamber opening, drive means connected to the outer end of said rod, a latch on said bar engaging and holding the inner end of said rod against movement relative to the bar, means for releasing said latch when one feed finger encounters a resisting force on a working stroke exceeding a predetermined amount to permit said rod to move outwardly relative to said bar, a spring interposed between said bar and said rod for returning said rod to latched position on the return stroke of the feeding means following the working stroke in which the unlatching occurs, and means for cushioning the return of said rod, said cushioning means comprising a piston within said rod, and fixed relative to said bar, the size of said piston being such relative to the size of the bore of said rod that the passage of air past said piston on movement of the rod relative to the piston is resisted, means permitting relatively free escape of air from said rod when the rod moves outwardly relative to said bar, and means restricting the escape of air from the rod when it is moving inwardly relative to the bar.

3. A hay baler as recited in claim 2 wherein said bar has a bearing affixed to it at said proximate end through which said rod extends, and said restricting means comprising a needle valve communicating with the bore of said rod and mounted on the rod externally of said bar.

4. A hay baler comprising a bale chamber having a feed opening in a vertical side wall thereof, a hay receiving platform extending from said opening, and reciprocable means for feeding hay across said platform, through said opening and into said chamber, said feeding means comprising a tubular support bar mounted above said platform and extending in the same direction as the direction of extent of the platform, a plurality of feed fingers mounted on said bar in spaced relation thereon, a stop within said bar adjacent the end of the bar remote from said bale chamber, a tubular rod extending into said bar through the end thereof proximate to said bale chamber, said rod having an inner end normally abutting against said stop and an outer end projecting outwardly of said bar, a bearing affixed within said bar adjacent said proximate end for guiding and supporting said rod outer end, a piston affixed to the inner end of said rod, a latch mounted on said bar and engaging said piston for restraining said rod against outward movement relative to the bar, means biasing said latch toward latched position, a spring interposed between said piston and bearing and urging said piston toward said stop, an elongate member extending into said rod for the major portion of the length of the rod, said member having one end affixed to said stop and an end opposite said one end to which a second piston is attached, said second piston being of such size relative to the bore of said rod as to resist the passage of air past it, means for permitting free escape of air from said rod when the rod moves outward relative to said bar and second piston, and means for resisting the escape of air from said bar when said rod moves inwardly relative to the bar and second piston.

5. A hay baler as recited in claim 4 wherein said piston affixed to said rod has a pair of cam faces, one adjacent said stop and the other at the end of the piston remote from the stop, said other cam face being engaged by said latch when said rod is in latched position, said one cam face engaging said latch when said rod is returning toward a latched position after becoming unlatched, said cam faces being such that said latch may be moved more easily against the resistance of said biasing means when said rod is returning toward latched position than when said rod moves outwardly relative to said bar.

References Cited in the file of this patent

UNITED STATES PATENTS

| | | |
|---|---|---|
| 2,485,001 | Kane | Oct. 18, 1949 |
| 2,572,180 | Morrison | Oct. 23, 1951 |
| 2,647,355 | Luke | Aug. 4, 1953 |
| 2,720,073 | Freeman, Jr. | Oct. 11, 1955 |
| 2,725,009 | Bornzin | Nov. 29, 1955 |
| 2,760,625 | Lohnert | Aug. 28, 1956 |
| 2,854,809 | Starrett et al. | Oct. 7, 1958 |
| 2,950,670 | Nolt et al. | Aug. 30, 1960 |

FOREIGN PATENTS

| | | |
|---|---|---|
| 741,233 | Australia | Nov. 30, 1955 |